BACKGROUND NOISE COMPENSATED RECORDING PLAYER

Filed Aug. 7, 1961 3 Sheets-Sheet 1

INVENTORS
Harold O. Schwartz
Harry B. Hammill
By: Olson & Trexler attys.

BACKGROUND NOISE COMPENSATED RECORDING PLAYER

Filed Aug. 7, 1961 3 Sheets-Sheet 2

INVENTORS
Harold O. Schwartz
BY Harry B. Hammill
Olson & Trexler
attys.

BACKGROUND NOISE COMPENSATED RECORDING PLAYER

INVENTORS
Harold O. Schwartz
Harry B. Hammill
By: Olson & Trexler Attys.

United States Patent Office 3,135,836

Patented June 2, 1964

3,135,836

BACKGROUND NOISE COMPENSATED RECORDING PLAYER

Harold O. Schwartz, North Tonawanda, and Harry B. Hammill, Williamsville, N.Y., assignors to The Wurlitzer Company, Chicago, Ill., a corporation of Ohio Filed Aug. 7, 1961, Ser. No. 129,608

10 Claims. (Cl. 179—100.1)

The present invention relates to automatic phonographs and particularly to coin controlled phonographs which are commonly installed in public or semi-public establishments, such for example as restaurants, grills, and short order shops.

Such phonographs operate unattended for unlimited periods of time during which customers can deposit coins in a phonograph and the phonograph will respond automatically to play the record selected by the customer.

In order for those present to obtain maximum enjoyment of the music, it is necessary that the records be acoustically reproduced at an optimum loudness level, which should be sufficiently high to afford full listening pleasure, yet not sufficiently loud to be a source of irritation.

The matter of obtaining an optimum loudness level of an automatic phonograph which operates unattended over long periods of time is complicated by a number of factors, some of which are external to the phonograph itself. The result has been that, as a practical matter, conventional automatic phonographs operating in business establishments have not played records consistently at an optimum volume level, even though the phonographs are equipped with manually operable volume controls. Since the optimum volume level must be determined in accordance with the preferences and sensitivities of all those present, rather than just the desires of the paying customers alone, it is desirable that the conventional volume controls be made accessible only to responsible people in charge of the premises. Yet, even these people cannot be depended upon to adjust the volume to maintain an optimum acoustical output level.

Thus, in order to maintain an optimum output level, it is necessary to adjust the output level to compensate for changes in the level of the background noise. Other things being equal, an output volume which provides for optimum listening when the background noise is low will be inadequate when the background noise is increased. Similarly, an output volume which is adequate when the background noise is high can be excessive under quieter conditions.

In a business establishment, the level of the background noise can change radically between slack periods and peak business hours. People having access to the volume controls often neglect to adjust the controls to compensate for changes in the background noise level. At best, the necessity for manually adjusting the controls is a nuisance.

One object of the invention is to provide a new and improved phonograph which will operate to play records automatically at an optimum listening level under changing background noise conditions.

Another object is to provide an automatic record playing machine which automatically compensates for changes in the background noise level to maintain an optimum listening level in the playing of the recordings, even though the background noise level may vary radically from time to time.

Another object of the invention is to provide an automatic phonograph which will operate unattended over an indefinite period of time to reproduce music at optimum listening levels simultaneously in each of a plurality of rooms or areas having different levels of background noise which vary independently of each other.

Another object is to provide a new and improved automatic phonograph having an output level which is automatically readjusted between the playing of successive records to compensate for changes in the background noise level.

Another object is to provide an improved automatic phonograph, as recited in the preceding objects which plays recordings at an output volume which compensates for the average background noise level at the time each recording is played.

A further object is to provide, in an automatic phonograph, for automatic control of the output volume in accordance with the background noise level in a manner which avoids disturbance of the output volume by abnormal deviations of the background noise from the average noise level, even though these deviations may persist over an appreciable period of time, such deviations being of insufficient length to require compensating changes in the output level of the phonograph.

A further object is to provide a new and improved phonograph of the above character which will operate dependably over a long service life.

Other objects and advantages will become apparent from the following description of the exemplary form of the invention illustrated in the drawings, in which.

Figure 1:
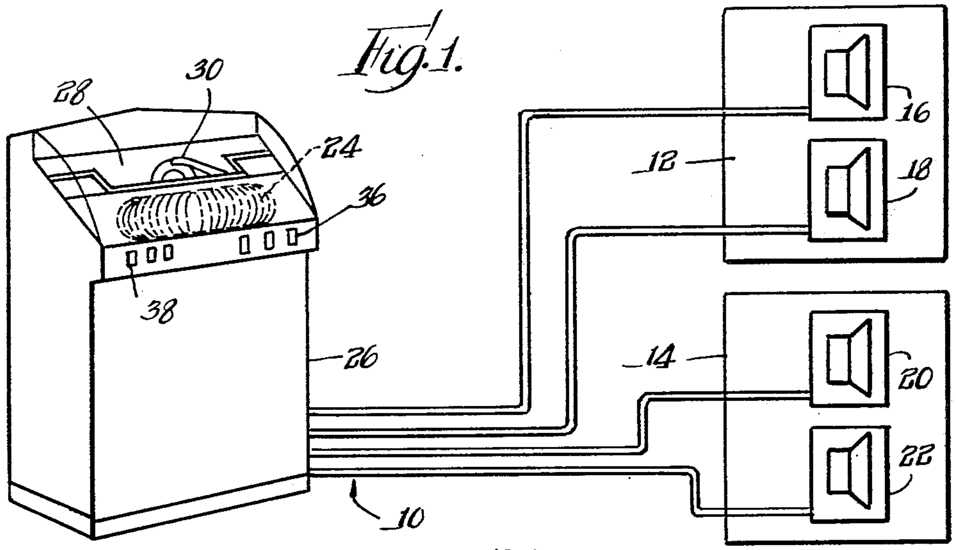
FIGURE 1 is a partially schematic view of a phonograph system forming the exemplary embodiment of the invention.

Referring to the drawings in greater detail, the coin controlled automatic phonograph 10 forming the illustrated embodiment of the invention, FIG. 1, is designed to play stereophonic records. The phonograph 10 is installed in a public establishment, such for example as a restaurant, in the same manner as a conventional coin controlled phonograph.

The particular phonograph illustrated is adapted to supply music to more than one room or room area. Two room areas 12, 14 supplied with music from the phonograph 10 are illustrated schematically in FIG. 1, the room 12 being equipped with two stereophonic loud speakers 16, 18, and the room 14 being equipped with two stereophonic loudspeakers 20, 22.

A selection of records stored in a magazine 24 within the main cabinet or case 26 of the phonograph 10 are played selectively and automatically by conventional automatic record playing means 28 housed in the cabinet.

A stereophonic pickup 30 is connected to two amplifiers 32, 34 in two separate sound channels which for convenience will be referred to as Channel "A" and Channel "B." The amplifiers 32, 34 are used to drive respectively Channel A speakers 16 and 20 and Channel B speakers 18 and 22 in the rooms 12 and 14. It will be understood that more than one loud speaker can be provided in each room for each channel, if desired. Moreover, as will presently appear, the phonograph can be adapted to serve as many different room areas as desired.

As previously intimated, the phonograph 10 operates unattended over indefinite periods of time. The customer has no control over the operation of the phonograph.

other than to deposit coins in the slot 36 and to operate buttons 38 to make record selections.

In accordance with the present invention, the loudness or volume level at which the records are played in each room 12, 14 is automatically adjusted to compensate for changes in the background noise in the respective rooms. Thus, the volume at which records are played in each room is adjusted in accordance with the background noise in that room only, independently of the noise and output volume in the other room.

Figure 2:
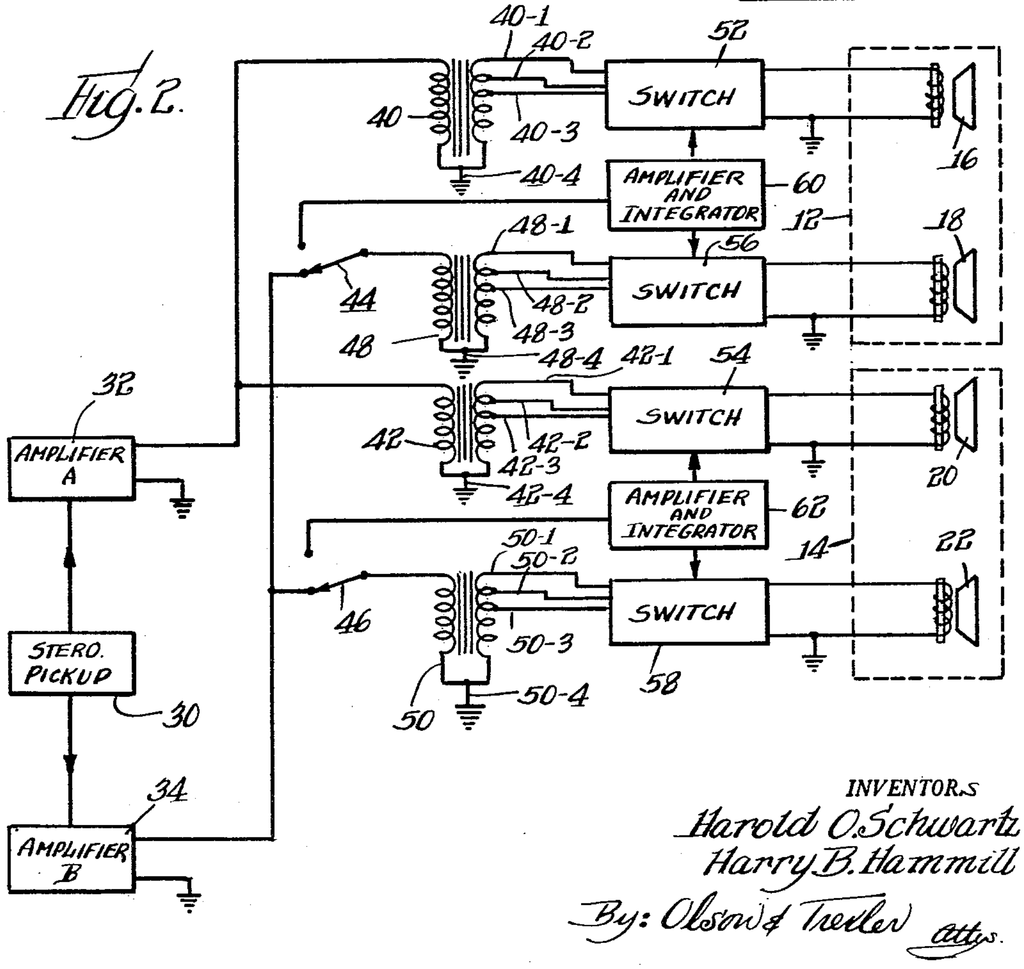
FIG. 2 is a diagrammatic illustration of the sound channels in the improved phonograph.

Having reference to FIG. 2, it will be noted that a separate output transformer is provided in each sound channel for each separate room or room area for which the output volume is to be separately controlled. Thus, the program amplifier 32 for Channel A is connected to the input windings of two transformers 40, 42 for the respective rooms 12 and 14. The output of the Channel B amplifier 34 is connected through input terminals of two switches 44, 46 with the input windings of two transformers 48, 50 for the respective rooms 12, 14.

The individual transformers 40, 42, 48 and 50 are identical to each other. The transformer 40 which is typical of the four transformers illustrated, has three volume control output terminals or taps 40–1, 40–2 and 40–3, plus a grounded output terminal 40–4. Similar output terminals similarly designated are provided on the other transformers 42, 48 and 50.

The three volume control taps 40–1, 40–2 and 40–3 of the transformer 40 are connected to a volume controlling switch assembly 52 which connects the transformer 40 to drive the loud speaker 16. Similarly, the output taps of the transformers 42, 48 and 50 are connected respectively through volume control switch assemblies 54, 46 and 48 to drive the speakers 20, 18 and 22.

It is fitting to note at this point that there is an appreciable lapse of time from the completion of the playing of one record to the beginning of the playing of the succeeding record. This time is consumed in returning the record that has just been played to the magazine 24 and in selecting and moving into playing position the next record to be played.

The background noise in each of the rooms 12 and 14 is sensed or listened to electronically during the period when the phonograph itself is silent, and more specifically, during the period elapsing between the beginning of the selection of a record for playing and the time the record starts to play. In a typical automatic phonograph of this character, approximately seven seconds is required for selection of an individual record and starting playing of the record.

As will presently appear, the phonograph 10 forming the exemplary embodiment of the invention electronically listens to the background noise in the respective rooms 12 and 14 for five of the seven seconds required to initiate playing of a record. Moreover, as will presently appear, the intensity of the background noise over this five second period is electronically averaged and used as a basis for determining the volumetric level at which the record is played in each room.

The background noise levels in the rooms 12 and 14 are sensed by the loud speakers 18 and 22 for Channel B, these speakers being adapted to serve as microphones adequate for this purpose.

The Channel B speakers 18 and 22 are continuously connected through the switch assemblies 56, 58 with the transformers 48, 50. During the interval between the playing of one record and the playing of the next successive record the previously mentioned switches 44, 46 are operated in unison to switch the inputs of the transformers 48, 50 from the output of the amplifier 34 to the inputs of two separate noise amplifying and electronic integrating assemblies 60, 62 for controlling the phonograph output volume in the respective rooms 12 and 14.

The operation of the noise amplifier, electronic integrator and switch structure to control the output volume in each room can be best understood with reference to a description of the structure provided for this purpose.

Figure 3:
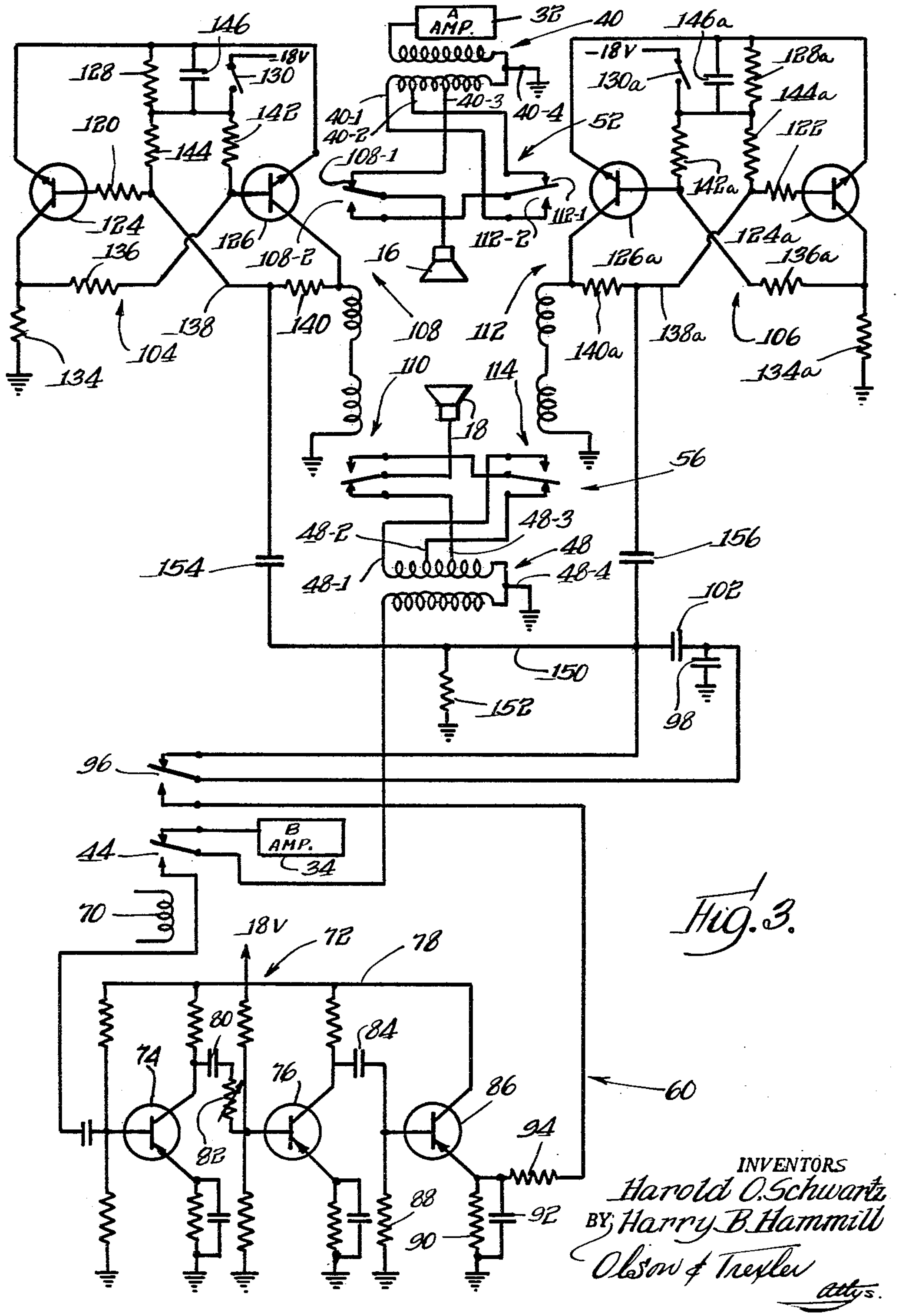
FIG. 3 is a diagrammatic illustration of volume compensating control circuits used in the phonograph.

The volume control structure used to control the output volume in the room 12 is illustrated in detail in FIG. 3. It will be understood that the structure used to control the output volume in the room 14 is identical to that used to control the volume in room 12.

Thus, as illustrated in FIG. 3, the listening switch 44 is temporarily shifted to listening position by energization of a solenoid switch operator 70 during operations of the phonograph which select and initiate playing of a record. Thus, the listening speaker 18 is connected through the switch assembly 56, transformer 48 and switch 44 to the input of a noise amplifier 72 in the amplifying and integrating assembly 60.

Preferably, the noise amplifier 72 comprises two transistors 74, 76 connected in cascade and energized by an 18 volt D.C. power conductor 78. The collector of the transistor 74 is connected through a coupling capacitor 80 and a variable resistor 82 with the base of the transistor 76. The resistor 82 can be adjusted to vary the gain of the amplifier. The gain of this two-stage amplification is designed to amplify the noise to a peak voltage of 0–6 volts at the collector of the transistor 76.

The collector of the transistor 76 is connected through a coupling capacitor 84 with the base of a third transistor 86 which is grounded through a 10 kilohm resistor 88. The collector of the transistor 86 is connected to the power conductor 78, and the emitter of the transistor 86 is grounded through a 22 kilohm resistor 90 and a 50 microfarad capacitor 92 in parallel.

Thus, no D.C. bias current is provided in the transistor 86 and the transistor is cut off when no signal is applied from the transistor 76.

When background noise is present and an amplified noise signal is applied to the transistor 86, collector current flows in the transistor 86 during the negative part of the cycle and the capacitor 92 charges. The time constant of the capacitor 92 and its shunt resistor 90 is large in comparison to the period of the noise component. Hence, the potential of the emitter of the transistor 86 remains essentially constant during the positive swing of the signal cycle. This results in a D.C. voltage at the emitter of the transistor 86 which is equal to the peak signal voltage at the collector of the transistor 76. This D.C. voltage at the emitter of the transistor 86 rapidly fluctuates with the noise level. It is, as will presently appear, integrated over the five second listening period to obtain a voltage which is an accurate measure of the average background noise level over the listening period.

This integration of the voltage on the emitter of the transistor 86 is effected by an 82 kilohm resistor 94 connected through a single pole, double throw switch 96 with a grounded 100 microfarad capacitor 98 and one side of a 100 microfarad capacitor 102. The switch 96 is ganged with the previously mentioned listening switch 44 and is operated by the solenoid 70 to connect the resistor 94 with the capacitors 98 and 102 only when the solenoid 70 is energized.

The switch solenoid or relay 70 is energized at the beginning of the five second listening period and deenergized immediately at the end of this period. Deenergization of the relay solenoid 70 allows the listening switch 44 to reconnect the speaker transformer 48 to the B amplifier 34 and it causes the relay switch 96 to disconnect the capacitors 98 and 102 from the resistor 94.

It should be noted here that the resistor 94 and the capacitors 98 and 102 used in electronically integrating the emitter voltage of the transistor 86 over a five second period have a time constant of fifteen seconds. Thus, by way of example, a peak signal of six volts applied to the base of the transistor 86 for five seconds would result in changing the capacitors to a potential of −1.0 volt.

Upon operation of the relay switch 96 to disconnect the integrating capacitors 98, 102 from the integrating resistor 94, the integrated voltage on the capacitors, which is an acurate measure of the average background noise, is applied to control two flip-flop circuits 104, 106 which control the volume control switching means 52, 56, for controlling the volume at which the record is played in the room 12.

The flip-flop circuit 104 controls two relays 108, 110 incorporated into the two switching assemblies 52 and 56, as illustrated in FIG. 3. The solenoids of the relays 108, 110 are connected in series, as shown, to be controlled together. Similarly, the flip-flop circuit 106 controls two relays 112, 114 in the respective switching assemblies 52, 56. Before describing operation of the flip-flop circuits 104, 106, it will be helpful to first review the structure and operation of the switch assembly 52 which is typical of the volume control assemblies for the respective loud speakers in the system. Thus, as illustrated in FIG. 3, the lowest volume output tap 40–3 of the transformer 40 is connected through a normally closed relay switch 108–1 to the speaker 16. The speaker 16 is also connected through a normally open relay switch 108–2 and normally closed relay switch 112–1 to the intermediate output volume tap 40–2 of the transformer 40. The highest output volume tap 40–1 of the transformer 40 is connected through a normally open relay switch 112–2 with the output side of the normally open relay switch 108–2.

Thus, when both relays 108 and 112 are deenergized, the speaker 16 is connected through the relay switch 108–1 with the lowest output volume tap 40–3. Energization of the relay 108 connects the speaker 16, through relay switch 108–2 and normally closed relay switch 112–1, with the intermediate volume output volume tap 40–2. Energization of both relays 108, 112 connects the speaker 16 through relay switch 108–2 and relay switch 112–2 to the highest output volume tap 40–1.

It is noteworthy at this point that the four taps 40–1, 40–2, 40–3 and 40–4 of the typical transformer 40 are spaced 7 db apart, so that the switching assembly 52 provides for increasing the volumetric output of the speaker 16 in 7 db steps.

The two flip-flop circuits 104, 106 are identical to each other except for the values of control resistors 120, 122 in the respective circuits. As will presently appear, the values of these resistors determine the responsiveness of the respective circuits to triggering voltages applied from the capacitors 98 and 102. Preferably, the two flip-flop circuits 104, 106 are designed to respond to trigger voltages which are 7 db apart, which value corresponds to the 7 db spacing between the voltage taps 40–1 and 40–2 on the transformer 40.

The flip-flop circuit 104, for example, comprises two parallel transistors 124, 126 having emitters connected through a common resistor 128 with a switch 130 which supplies a negative direct current voltage of 18 volts. The collector of the transistor 124 is connected to ground through a 15 kilohm resistor 134 and to the base of the transistor 126 through a 4.7 kilohm resistor 136. The collector of the other transistor 126 is connected to ground through the two previously mentioned relays 108, 110 and to a control conductor 138 through a 4.7 kilohm resistor 140.

The control conductor 138 is connected through the previously mentioned control resistor 120 with the base of the transistor 124. The output side of the power supply switch 130 is connected through a 15 kilohm resistor 142 with the base of the transistor 126 and through a 15 kilohm resistor 144 with the control conductor 138, which, as previously stated is connected through the control resistor 120 to the base of the transistor 124. A 20 microfarad capacitor 146 is connected in parallel across the resistor 128.

Component elements of the flip-flop circuit 106 corresponding to those of the flip-flop circuit 104 described are identified by the same reference numbers, with the addition of the suffix "*a*." The components of the two flip-flop circuits have the same electrical values except for the previously mentioned control resistors 120, 122 which determine the sensitivity of the respective circuits to the integrated background noise control voltage.

Because of the presence of capacitors 154, 156 and 98, transistors 124 and 124*a* assume conducting states when switches 130 and 130*a* are closed. This results in transistors 126 and 126*a* being non-conducting, and therefore the relays 108, 110, 112, and 114 are de-energized.

Operation of the listening switch 96 at the end of the listening period disconnects the integrating capacitors 98, 102 from the integrating resistor 94 and connects the integrating resistor sides of both of these capacitors to a conductor 150 which is grounded through a 1 kilohm resistor 152. The conductor 150 is coupled through the two 100 microfarad capacitors 154, 156 with the control conductors 138, 138*a* of the respective flip-flop circuits 104, 106.

It is noteworthy that the side of the capacitor 102 opposite from the integrating capacitor 98 is permanently connected to the conductor 150. Hence, this capacitor 102 is shortcircuited upon operation of the double throw relay switch 96 to connect the integrating capacitor 98 to the conductor 150.

The mechanical characteristics of the relay switch 96 are such that the coacting switch contacts tend to bounce relative to each other upon operation of the switch to connect the capacitor 98 to the conductor 150 grounded through the resistor 152. This bouncing of the relay switch 96 would tend to discharge the integrating capacitor 98 before its voltage could be fully and effectively applied to the conductor 150 for operating the flip-flop circuits 104, 106. However, such dissipation of the charge of the capacitor 98 is prevented by the release of the charge on the capacitor 102 as the relay bounces.

After operation of the relay switch 96, the full voltage of the integrating capacitor 98 is applied to the conductor 150 to operate through the capacitors 154, 156 on the control conductors 138, 138*a* in the flip-flop circuits 104, 106.

Thus, the voltage applied to the control conductors 138, 138*a* is a function of the average noise level sensed during the listening period. In the present instance, the flip-flop circuit 104 is designed to be triggered by a voltage of .31 volt on the conductor 138, and the circuit 106 is designed for triggering of voltage of .70 volt on the conductor 138*a*.

When the noise level exceeds a predetermined value, the voltage on the conductor 138 causes the circuit 104 to flip to an operating condition in which the transistor 126 conducts to energize the relays 108, 110 and thereby connect the speakers 16, 18 to the medium volume taps of the transformers 40, 48. When the background noise exceeds a higher value approximately 7 db above the noise level required to trigger the circuit 104, the flip-flop circuit 106 is triggered to cause the transistor 126*a* to conduct and energize the relays 112, 114 along with the relays 108, 110. The effect of this is to connect the speakers 16, 18 with the maximum volume taps of the transformers 40, 48.

The result is to play the next record at one of three volume levels which is automatically conformed to the intensity of the background noise to provide optimum listening pleasure.

After the record has been played and during the seven second period during which the record is returned to the magazine 24, the energizing switches 130, 130*a* for the flip-flop circuits 104, 106 open, whereupon the four relays 108, 110, 112 and 114 are deenergized and the flip-flop circuits are restored to their normal condition to respond in the manner described to the integrated noise voltage, upon reclosure of the switches 130, 130*a* and operation of the relay switch 96 in the manner described.

Averaging of the background noise level over a five second listening period in the manner described normally provides an accurate base for setting the volume level at which the next record is played. However, it is possible that during this five second listening period there may be an abnormal noise, such for example as a continuing burst of laughter, which might not be an accurate representation of the average noise level. While this condition would seldom occur, and even though it would result in only one record being played at a volume level which was too loud, provision is made by the invention for eliminating any disturbance or inaccuracy in the automatic control of the volume level caused by a temporary and abnormal loud noise coinciding with a major portion of a listening period.

Figure 4:
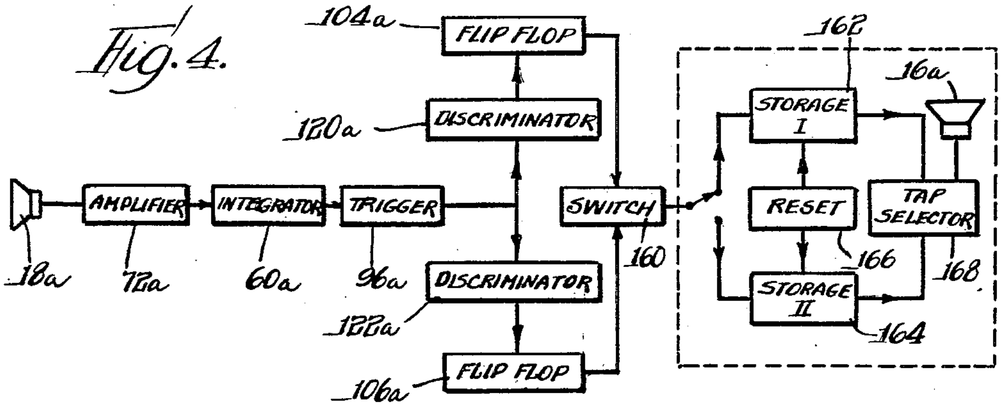
FIG. 4 is a block diagram illustrating phonograph control circuitry incorporating additional features of the invention.
Figures 5, 6:
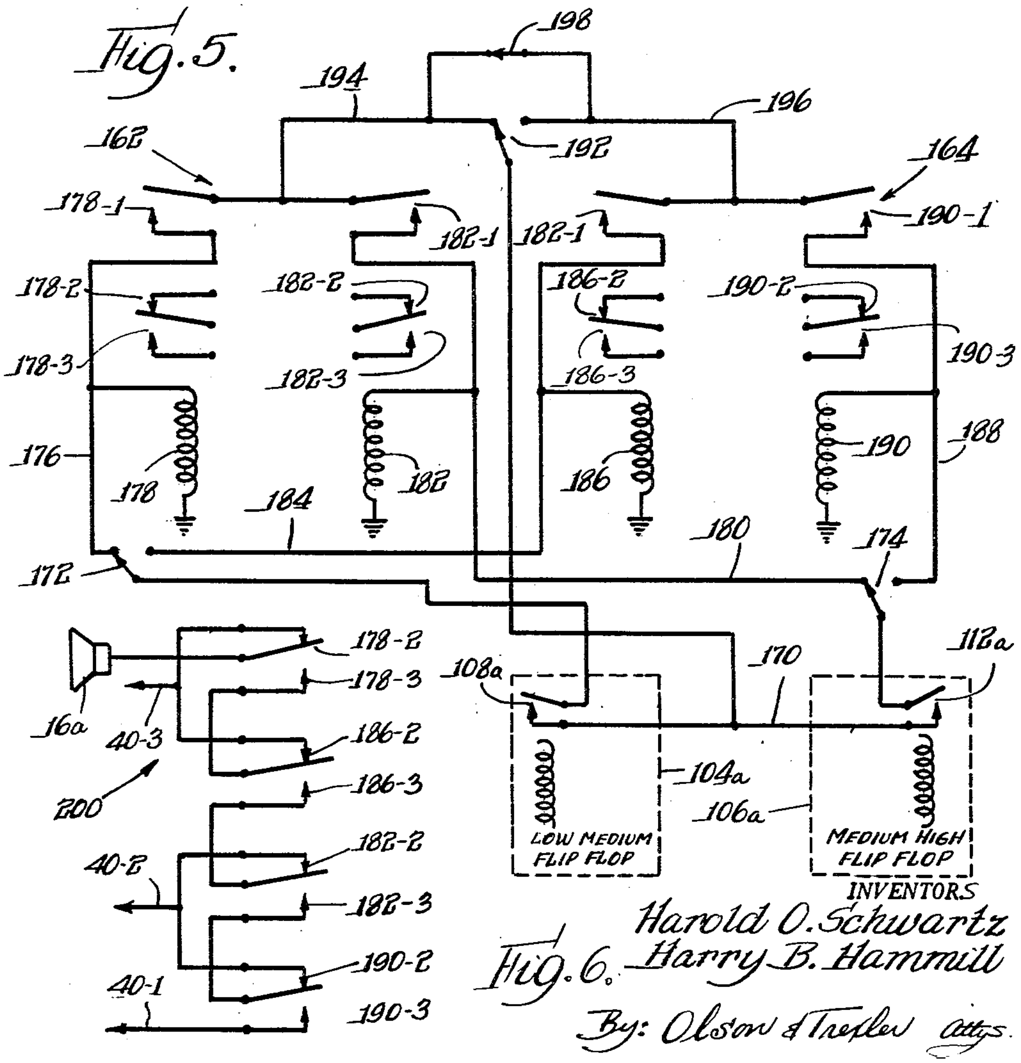
FIG. 5 is a circuit diagram of storage or memory circuits incorporated into the controls illustrated in FIG. 4.
FIG. 6 is a diagrammatic illustration of volume control circuits controlled by the memory relays shown in FIG. 5.

Thus, in accordance with additional features of the invention which are illustrated in FIGS. 4 and 5, the output volume level is automatically set in accordance with the lowest background noise level sensed during the two successive listening periods immediately preceding the playing of each record. A listening period precedes the playing of each record, in the manner described. Thus, the two listening periods preceding the playing of each record are spaced apart by the time required to play one record. Hence, the likelihood of two abnormally loud noises occurring during two successive listening periods is extremely remote. As will presently appear, an exceptionally loud noise occurring during only one listening period has little effect on the automatic volume control.

Referring to FIGS. 4 and 5, component elements corresponding to those previously described in relation to FIGS. 1 to 3 are identified by the same reference numbers, with the addition of the suffix "*a*." Thus, as illustrated in FIG. 4, the listening speaker 18*a* is connected to the noise amplifier 72*a*, the output of which is integrated by the integrator 60*a* and connected through a trigger or relay switch 96*a* with the discriminators or resistors 120*a* and 122*a* of flip-flop circuits 104*a* and 106*a*.

The two flip-flop circuits 104*a*, 106*a* connect with a switching assembly 160 which connects the flip-flop circuits to two storage or memory circuits 162, 164 alternately. The memory circuits 162, 164 are controlled by resetting circuits 166 and control a tap selector circuit 168 which controls the output volume of the speaker 16*a*.

The two flip-flop circuits 104*a*, 106*a* are controlled by the noise sensed over a five second listening period by the speaker 18*a* in the same manner as the circuits 104, 106 illustrated in FIG. 3 are controlled. Triggering of the low-medium flip-flop circuit 104*a* connects a direct current power conductor 170, FIG. 5, to the input of a single pole, double throw switch 172. Triggering of the medium-high flip-flop circuit 106*a* closes a relay switch 112*a* to connect the power conductor 170 with the input of a single pole, double throw switch 174.

The two switches 172, 174 are ganged together and operated between the completion of the playing of each record and the beginning of the playing of the next successive record to connect the relay switches 108*a* and 112*a* to the two storage or memory devices 162, 164, alternately.

Thus, with the switches 172, 174 in the positions illustrated in FIG. 5, the switch 108*a* is connected to a conductor 176 to energize a relay 178, and the switch 112*a* is connected to a conductor 180 to energize a relay 182.

Operation of the switches 172, 174 to shift these switches in unison away from the the positions shown to their second operating positions connects the relay 108*a* to a conductor 184 to energize a relay 186 and connects the relay switch 112*a* to a conductor 188 to energize a relay 190.

All four of the relays 178, 182, 186 and 190 are memory relays, the two relays 178 and 182 being incorporated into the memory circuit 162 and the memory relays 186 and 190 being incorporated into the memory circuit 164.

Energization of the memory relays in the respective memory circuits 162, 164 is maintained selectively by means of a single pole, double throw switch 192 ganged with the switches 172, 174 and arranged to connected the power conductor 170 to two relay holding conductors 194, 196 selectively. The conductors 194 and 196 are connected by a normally closed switch 198 which is coordinated with the switch 192, as will presently appear.

Initial energizeration of the respective holding relays 178, 182 is maintained through two holding relay switches 178–1 and 182–1 which connect with the holding conductor 194. Similarly, initial energization of the respective memory relays 186, 190 is maintained through two holding relay switches 186–1 and 190–1, which connect with the holding conductor 196.

The memory circuits 162, 164 illustrated in FIG. 5 control the volumetric output of a single loudspeaker 16*a* through relay switches which connect with the output taps of the coacting volume control transformer for the speaker 16*a*. Only the low volume tap 40–3, medium volume tap 40–2 and high volume tap 40–1 of the transformer are illustrated in FIG. 6.

The memory relays 178, 182, 186 and 190 are designed to connect the speaker 16*a* to the appropriate tap on the coacting transformer which corresponds to the lowest of the noise levels sensed in the two listening periods immediately preceding the playing of each individual record. The operation of these relays will be better understood with reference to a description of the structure involved.

Thus, as illustrated in FIG. 5, energization of relay 178 opens normally closed relay switch 178–2, and closes relay switch 178–3. Similarly, energization of the respective relays 182, 186 and 190 opens normally closed relay switches 182–2, 186–2 and 190–2 and closes normally open relay switches 182–3, 186–3 and 190–3. These relay switches are interconnected with each other and with the speaker 16*a* and the output taps 40–1, 40–2 and 40–3 of the coacting speaker transformer, as illustrated in FIG. 6.

Thus, as shown in FIG. 6, the volume control circuits 200 interconnected with the memory relay switches connect the speaker 16*a* with the lowest volume output tap 40–3 when all of the four memory relays are deenergized. Moreover, the speaker 16*a* remains connected to the lowest volume output tap 40–3 upon energization or setting of either of the medium volume relays 178, 186. However, energization of both of the medium volume relays 178, 186 at once connects the speaker 16*a* to the medium volume tap 40–2. To connect the speaker 16*a* to the high volume tap 40–1 it is necessary that all four memory relays 178, 186, 182 and 190 be energized or set.

As illustrated in FIG. 5, the two medium volume relays 178, 186 and the two high volume relays 182, 190 are included in the respective memory circuits 162, 164 to be set in accordance with the background noise level sensed in alternate listening periods.

A description of the operation of this circuitry may start with the assumption that the switch 198, FIG. 5, is closed and the switches 172, 174 and 192 are in the positions shown in solid lines. The switch 198 energizes the holding conductor 196 to continue energization of either of the relays 186, 190 set during the previous listening period. During the listening period immediately preceding the playing of a record, the flip-flop circuit control relays 108*a* and 112*a* effect energization of the medium volume relay 178 and high volume relay 182 and the memory circuit 162 in accordance with the sound level sensed just before the record is played.

After the record is played, the switch 198 is momentarily opened to effect deenergization of the memory relays 186, 190 in the memory circuit 164. After the flip-flop circuits 104*a* and 106*a* have been reset in the manner described to open the switches 108*a* and 112*a*, and after the switch 198 has reclosed, the switches 172, 174 and 192 switch to their other operating positions to effect setting of the memory relays 186, 190, in accordance with the noise level sensed during the next listening period. The setting of the memory relays 178, 182 in the memory circuit 162 is continued by energization of the holding conductor 194 through the switch 198. Hence, the selective energization of the four memory relays 178, 182, 186, 190 during two successive listening periods operates through the volume control circuitry illustrated in FIG. 6 to control the volumetric output of the speaker 16*a* in the manner described.

This operating cycle is repeated as successive records are played, with the result that closure of the medium volume relay switch 108*a* during two successive listening periods is required to play a record at a medium volume level, and closure of both the medium and high volume relays 108*a* and 112*a* during two successive periods is required to play a record at a high volume level.

It will be understood that the invention is not necessarily limited to use of the particular construction illustrated, but includes variants and alternatives within the spirit and scope of the invention as defined by the claims.

The invention is claimed as follows:

1. In an automatic phonograph, the combination of means for holding a plurality of records in readiness for playing, means for automatically playing records from said holding means, a loudspeaker capable of electronically sensing background noise, a program amplifier connected to said record playing means, a transformer for connecting said program amplifier to said loudspeaker and including a plurality of volume control taps, volume control switching means coacting with said transformer taps to control the output volume of said loudspeaker, a noise amplifier for electronically amplifying noise signals from said loudspeaker, an electronic integrator for integrating over a substantial period of time the output of said noise amplifier, second switching means operated in synchronism with said automatic record playing means and being interconnected in series with said noise amplifier between said integrator and said loudspeaker to connect said loudspeaker through said noise amplifier to said integrator upon completion of the playing of a record by said record playing means and to disconnect said loudspeaker from said integrator as an incident to operation of the record playing means to begin playing a record, flip-flop circuit means for controlling said volume control switching means, and means for connecting said electronic integrator to said flip-flop circuit means to control conductance of said flip-flop circuit means to operate said volume control switching means to change the output volume of said loudspeaker in accordance with the electrical values integrated by said integrator during intervals between the playing of successive records when the integrator is connected through said second switching means with the loudspeaker.

2. In an automatic phonograph, the combination of means for holding a plurality of records in readiness for playing, means for automatically playing records from said holding means, means for electronically sensing background noise, volume control means for controlling the output volume of said record playing means, a noise amplifier for electronically amplifying noise sensed by said sensing means, an electronic integrator for integrating over a substantial period of time the output of said noise amplifier, flip-flop control circuit means coacting with said electronic integrator to be controlled in accordance with the electrical values integrated by said integrating means, two memory circuits, means for interconnecting said flip-flop circuit means with said memory circuits for resetting alternate ones of said memory circuits in accordance with the background noise level sensed by said sensing means during the successive intervals between playing of successive recordings, and means for setting said volume control means in accordance with the lowest background noise level registered by the two memory circuits.

3. In a machine for playing a plurality of recordings automatically, recording playing means, electronic listening means for sensing the level of background noise between the playing of successive recordings, volume control means for controlling the output volume of said recording playing means, two memory devices each including means for recording different background noise levels sensed by said listening means, means for recording in alternate ones of said memory devices the background noise levels sensed by said listening means during the successive intervals between playing of successive recordings, and means interconnecting said memory devices with said volume control means to operate the latter in accordance with the lowest background noise level recorded in the two memory devices during the two preceding intervals between the playing of recordings.

4. In a machine for playing recordings, a recording playing means, electronic listening means for sensing the level of background noise between the playing of successive recordings, volume control means for controlling the output volume of said recording playing means, said volume control means including a trigger control circuit therefore, a control capacitor, electronic integrating means responsive to said listening means to produce an output voltage corresponding to the level of background noise sensed by said listening means, first switch means for connecting said control capacitor to said integrating means to be charged by the latter, second means for connecting said capacitor to said trigger circuit, relay means for opening said first switch means and closing said second switch means to connect said control capacitor to said trigger circuit after it has been charged by said integrating means, and a capacitor connected across said second switch means to be discharged therethrough upon closing of said second switch means to connect said control capacitor to said trigger circuit.

5. Electrical sound producing means comprising, in combination, sound producing means for producing sound from electronic sound signals, volume control means for controlling the output volume level of said sound producing means and including a flip-flop control circuit therefor which is responsive to an applied control voltage, electronic listening means responsive to background noise, electronic integrating means responsive to said listening means and including a capacitor which is charged by the integrating means to a voltage corresponding to the level of background noise sensed by said listening means, switch means for intermittently connecting said capacitor to said flip-flop circuit to control the latter in accordance with the integrated voltage of the capacitor, and said integrating means including a capacitor connected across said switch means to be discharged therethrough upon closing of the switch means to connect said control capacitor to said flip-flop control circuit.

6. Sound producing apparatus comprising, in combination, means for producing sound from electrical sound signals, volume control means coacting with said sound producing means to control the output level thereof, means for electrically sensing the ambient sound level, an electronic integrating network connected with said sensing means to integrate an electrical value corresponding to the sound level sensed by said sensing means, said volume control means including means responsive to the application thereto of an electric value to effect a corresponding control of the output volume of said sound producing means, means for intermittently applying an electrical value integrated by said integrating network to said volume control network and including a relay switch, and a discharge capacitor connected across said switch to be short-circuited therethrough upon closure of said switch.

7. In an automatic recording player, the combination of means for holding a plurality of recordings in readiness for playing, means for automatically playing the recordings selectively, means for electronically sensing background noise, a program amplifier connected to said recording playing means, volume control means connected in series with said amplifier and including volume control switching means settable to different operating conditions which determine respectively different output levels at which recordings are played, a noise amplifier for amplifying electronic signals from said noise sensing means, an electronic integrator for integrating over a substantial period of time the output of said noise amplifier, second switching means operated in synchronism with said automatic recording playing means and being interconnected in series with said noise amplifier between said integrator and said noise sensing means to connect said noise sensing means through said noise amplifier to said integrator upon completion of the playing of a recording by said recording playing means and to disconnect said noise sensing means from said integrator as an incident to operation of the recording playing means to begin playing a recording, flip-flop circuit means for setting said volume control switching means to different operating conditions thereof, and means for connecting said electronic integrator to said flip-flop circuit means to control conductance of said flip-flop circuit to effect setting of said volume control switching means to an operating condition which corresponds to the electrical value integrated by said integrator during an interval between the playing of successive records and which operating condition is maintained throughout the playing of an individual recording.

8. In an automatic recording player, the combination of means for holding a plurality of recordings in readiness for playing, means for automatically playing the recordings selectively, means for electronically sensing background noise, a program amplifier connected to said recording playing means, volume control means connected in series with said amplifier and including volume control switching means settable to different operating conditions which determine respectively different output levels at which recordings are played, a noise amplifier for amplifying electronic signals from said noise sensing means, and electronic integrator for integrating over a substantial period of time the output of said noise amplifier, second switching means operated in synchronism with said automatic recording playing means and being interconnected in series with said noise amplifier between said integrator and said noise sensing means to connect said noise sensing means through said noise amplifier to said integrator upon completion of the playing of a recording by said recording playing means and to disconnect said noise sensing means from said integrator as an incident to operation of the recording playing means to begin playing a recordnig whereby said integrator functions during each interval between the playing of two successive recordings to integrate an electrical value corresponding to the average background noise sensed by said noise sensing means over a period of time between the playing of successive recordings, said volume control means including switch operating means interconnected with said integrator to effect setting of said volume control switching means to an operating condition which corresponds to the electrical value integrated by said integrator; said volume control means, which includes said volume control switching means and said operating means therefor, including means which maintains set operating conditions of said volume control switching means indefinitely independently of the electrical value integrated by said switching means; and means for synchronizing said switch operating means with said recording playing means to effect resetting said volume control switch means near the beginning of the playing of each successive recording and in accordance with the electrical value integrated by said integrator.

9. In an automatic recording player, the combination of pickup and recording shifting means for shifting different selected recordings into playing relation to said pickup, means for electronically sensing sound, a program amplifier connected to said pickup, volume control means connected in series with said amplifier for adjusting the output volume at which recordings are played, electronic means interconnected with said sound sensing means and including an electronic integrator for integrating an electrical value which corresponds to the average over a substantial period of time of the sound level sensed by said sound sensing means, electrical operating means for setting said volume control means to an adjusted condition in accordance with the electrical value integrated by said integrator, means for synchronizing said operating means with said recording playing means to effect resetting of said volume control means near the beginning of the playing of each recording and in accordance with the electrical value integrated by said integrating means, and said operating means and said synchronizing means together including means which maintains throughout the playing of each recording the set adjustment of said volume control independently of any changes in the electrical value integrated by said integrator.

10. Electrical sound producing means including mechanical-electric transducing means for producing electric oscillations from physical vibrations corresponding to sound, electronic amplifying means connected thereto for amplifying said electronic oscillations, electro-mechanical transducing means connected to said amplifying means for converting the amplified oscillations to sound, electronic listening means for sensing the level of background noise during pauses between the production of successive groups of sounds, volume control means for controlling the output volume of said sound producing means, two memory devices each including means for recording different background noise levels sensed by said listening means, means for recording in alternate ones of said memory devices the background noise levels sensed by said listening means during the successive intervals between the production of groups of sounds, and means interconnecting said memory devices with said volume control means to operate the latter in accordance with the lowest background noise level recorded in the two memory devices during the two preceding intervals between the production of groups of sounds.

References Cited in the file of this patent

UNITED STATES PATENTS

| | | |
|---|---|---|
| 2,466,216 | Ekstrand | Apr. 5, 1949 |
| 2,503,391 | Dannenberg | Apr. 11, 1950 |
| 2,892,891 | Manley | June 30, 1959 |